United States Patent
Tabarovsky et al.

[11] Patent Number: 5,878,372
[45] Date of Patent: Mar. 2, 1999

[54] METHOD FOR SIMULTANEOUS INVERSION PROCESSING OF WELL LOG DATA USING A PLURALITY OF EARTH MODELS

[75] Inventors: Leonty A. Tabarovsky; Michael B. Rabinovich, both of Houston, Tex.

[73] Assignee: Western Atlas International, Inc., Houston, Tex.

[21] Appl. No.: 811,523

[22] Filed: Mar. 4, 1997

[51] Int. Cl.$^6$ .................................................. G06F 19/00
[52] U.S. Cl. .................................................................. 702/7
[58] Field of Search ............................... 702/6, 7, 11, 12, 702/13, 8, 9, 10, 16; 367/73, 72, 69

[56] References Cited

U.S. PATENT DOCUMENTS 5,798,982   8/1998   He et al. ..................................... 367/73

*Primary Examiner*—Donald E. McElheny, Jr.
*Attorney, Agent, or Firm*—Richard A. Fagin

[57] ABSTRACT

A method of determining a plurality of formation models each of which will simulate the response of a well logging instrument. A measured response of the well logging instrument is used to generate an initial model using inversion processing. A response of the instrument to the initial model is synthesized. A singular value decomposition is performed on the synthetic response to generate eigenparameters of the initial model. Eigenparameters having the least significant overall contribution to the synthetic response are sequentially substituted with linear equations representing prior constraints on the initial earth model. A linear system, including the remaining ones of the eigenparameters and the linear equations is solved so that the eigenparameters are preserved exactly and the linear equations satisfy a least squares fit. An additional synthetic instrument response is generated for each solution to the linear system which falls below a predetermined error threshold. The additional instrument responses are compared with the synthesized response to the initial model. The one of the solutions to the linear system which represents an earth model providing minimum misfit with respect to equations representing the prior constraints is selected as the best fit model.

5 Claims, 2 Drawing Sheets

METHOD FOR SIMULTANEOUS INVERSION PROCESSING OF WELL LOG DATA USING A PLURALITY OF EARTH MODELS

BACKGROUND OF THE INVENTION

1. Field of the Invention

The invention is related to the field of well log data processing. More specifically, the invention is related to methods for efficiently determining multiple sets of earth formation parameters (models) each of which can cause the same well logging instrument response as is observed on an actual set of well logs.

2. Description of the Related Art

Well log data processing known in the art has as one objective to determine values of physical properties, such as electrical resistivity, of earth formations both in a zone not subject to invasion of wellbore drilling fluids as well as the values of the same physical properties in a so-called "invaded" zone subject to such infiltration of wellbore drilling fluids.

One type of well log data processing is known as "inversion" processing. One form of inversion processing is described, for example in L. R. Lines and S. Treitel, *Tutorial: A Review of Least-Squares Inversion and Its Application to Geophysical Problems, Geophysical Prospecting,* Vol. 32, pp 159–186 (1984). Inversion processing, for determining electrical resistivity values for example, includes generating an initial estimate, or model, of the resistivity parameters of the earth formations surrounding the well logging instrument in a wellbore. The parameters usually include the vertical thicknesses of the earth formations, the electrical conductivities (resistivities) of the earth formations, and the position of any radial boundaries and the conductivity on either side of such boundary of any particular earth formation having an invaded zone. "Vertical" is typically defined as being coaxial with the well logging instrument. The initial model is used to calculate simulated responses for the individual sensors in the well logging instrument. The simulated instrument responses are then compared with the actual sensor measurements made by the well logging instrument over the same axial interval of the wellbore. Differences between the simulated responses and the measured responses are used to adjust the parameters of the model. Adjustment can include changing the values of resistivity, and positions of axial and radial boundaries in the model. The simulated response calculation and comparison steps are repeated until the differences between the simulated responses and the measured responses fall below a predetermined error threshold. A model which generates simulated responses below the threshold difference, or at a minimum difference, is determined to include the most likely set of earth formation parameters.

A drawback to the inversion processing techniques known in the art is that the solutions they generate may not be unique. This means more than one model of the spatial distribution of the various physical properties of the earth formations could result in well logging instrument responses which are substantially the same as the responses observed in the particular earth formations. It is possible, of course, to test a number of different initial earth models to determine which ones of the different earth models could in fact result in the best match between simulated and observed well logging instrument response. The plurality of earth models can include differences between them such as the number of layers in the earth formations. Testing a plurality of initial earth models can be difficult and time consuming, however, because each initial earth model must undergo a complete inversion process to determine the adjusted or "final" earth model which would result in the observed well logging instrument response.

SUMMARY OF THE INVENTION

The invention is a method of determining a formation model which will best simulate the response of a well logging instrument in view of prior constraints on the model. A measured response of the well logging instrument is used to generate an initial formation model by using inversion processing. A response of the instrument to the initial model is then synthesized. A singular value decomposition is performed on the synthetic instrument response to generate eigenparameters of the initial formation model. The eigenparameters having the least significant overall contribution to the synthetic instrument response are sequentially substituted with linear equations. These linear equation represent the prior constraints on the initial earth model. A linear system, including the remaining ones of the eigenparameters and the substituted linear equations is then solved so that the eigenparameters are solved exactly and the linear equations satisfy a least squares fit. An additional synthetic instrument response is generated for each solution to the linear system. The additional synthetic instrument responses are compared with the synthesized response to the initial model. The responses which differ from the synthetic response to the initial model less than a predetermined error threshold are selected. The selected models are then tested for misfit with respect to the prior constraints. The one of the models which provides the minimum misfit with respect to the prior constraints is selected as the best fit model.

DESCRIPTION OF THE PREFERRED EMBODIMENT

The description of the invention to follow uses as an example the processing of electrical resistivity well log measurements, primarily because inversion processing is most commonly used for such measurements. It is to be clearly understood that other types of well log measurements may also be processed according to the method of this invention and that the invention is not meant to be limited to resistivity measurements. The first step in the method is to perform an inversion process on a set of well log measurements in order to generate an initial "model" of earth formations. The initial model of the earth formations represents a spatial distribution of physical properties of the formations which could in fact result in the well log instrument responses actually exhibited in the set of well log measurements used to generate the initial earth model. The initial earth model can be better understood by referring to FIG. 1, which includes a generalized representation of a well logging instrument disposed in a wellbore drilled through earth formations. The wellbore 12 is shown as penetrating a series of layers 1, 2, 3, 4, 5. The layers 1, 2, 3, 4, 5 represent various portions, each having distinct physical properties, of the earth formations through which the wellbore 12 is drilled. In this example an induction resistivity logging instrument 10 is shown disposed in the wellbore 12 as it typically would be used to acquire resistivity measurements of the earth formations. The induction logging instrument 10 is shown as including a transmitter T and a series of axially spaced apart receivers R1, R2, R3, R4 each of which acquires signals that depend on the conductivity of the surrounding media (the formations) and the spatial distribution of the conductivity of those media. Spatial distribution of the conductivity can be more simply represented as the geometry of the various conductivity "zones" located within the layers 1, 2, 3, 4, 5 surrounding the wellbore 12.

While this invention is described using an induction resistivity instrument to obtain the resistivity measurements, it should be clearly understood that measurements from other types of resistivity well logging instruments, such as a dual laterolog instrument well known in the art, could also be used to provide the measurements used in the method of the invention. See for example U.S. Pat. No. 5,585,727 issued to Fanini et al. It is only necessary that the well logging instrument measurements be related to enough different axial and radial regions (zones) about the wellbore that a model of the earth formations in two dimensions can be appropriately generated.

Figure 1:
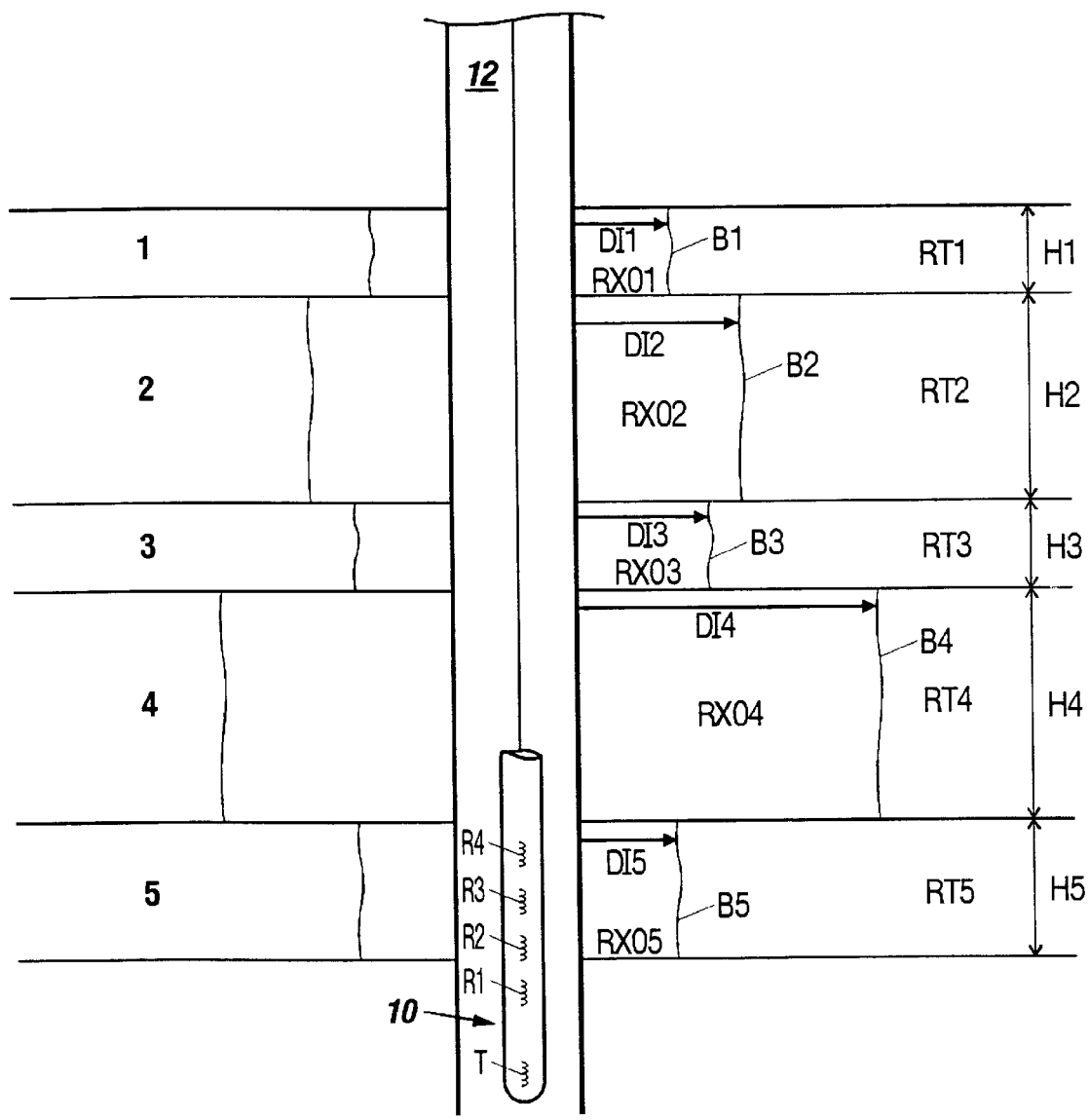
FIG. 1 is a generalized representation of an induction resistivity well logging instrument in a wellbore drilled through earth formations.

In the example shown in FIG. 1, an initial model which could be generated using inversion processing could include, for each of the layers 1, 2, 3, 4, 5, a thickness, shown as H1, H2, H3, H4, H5, respectively, a resistivity of an "uninvaded zone", shown respectively at RT1, RT2, RT3, RT4, and RT5, a resistivity of a "flushed zone", shown at RXO1, RXO2, RXO3, RXO4 and RXO5, and a diameter of invasion shown respectively at DI1, DI2, DI3, DI4 and DI5. As is known in the art, the uninvaded zone typically refers to a zone in which the liquid phase of a fluid (not shown) used to drill the wellbore 12 does not displace the native fluid present in the pore spaces of the particular layer of the earth formation. The flushed zone typically refers to zones in which the liquid phase of the fluid used to drill the wellbore has partially or substantially displaced the native fluid in present in the pore spaces of the formation layer. The diameter of invasion represents the diametric distance from the center of the wellbore 12 to a "boundary" shown at B1, B2, B3, B4, B5 which separates the uninvaded zone and the flushed zone. As is understood by those skilled in the art, the boundary B1, B2, B3, B4, B5 can be as simple as the planar contact shown in FIG. 1 or can take other forms, such as a gradation between the values of the physical properties in the flushed zone and in the uninvaded zone. The nature of the boundary, if present in any particular layer, is related to the type of inversion process used and is not meant to limit the invention. The ultimate objective of the inversion process is to determine values for the aforementioned resistivities, thicknesses and diameters of invasion which could cause the well logging instrument 10 to generate the measurements actually observed by actually operating the well logging instrument 10 through a set of earth formations penetrated by a wellbore.

An inversion processing, routine which is particularly well suited to use with this invention is described for example in, L. Tabarovsky and M. Rabinovich, *Real Time Two-Dimensional Inversion Process and its Application to Induction Resistivity Well Logging,* Transactions, 37th Annual Well Logging Symposium, Jun. 1996, Society of Professional Well Log Analysts, Houston, Tex. It is to be understood that the inversion processing routine described in this reference is not the only inversion processing routine which can be used in the method of this invention. The only requirement for the inversion processing routine which is ultimately used with the invention is that it have an output which is linearized with respect to the modeled values of the physical parameters of the earth formation. As described in the Tabarovsky et al reference, the model generated by the inversion process can be described by the following relationship:

$$\vec{\sigma}_a = \hat{G}\vec{\sigma} \qquad (1)$$

wherein vector $\vec{\sigma}_a$ on the left hand side of equation (1) represents a vector having dimension 1×n and including the apparent conductivity (resistivity) values as measured by the resistivity well logging instrument 10. This matrix is referred to as the "instrument response" or response matrix. Matrix G has dimension m×n and represents the individual responses of formation "blocks" each having a specific geometry with respect to the instrument 10, and each such block has a conductivity of 1 S/m. Vector σ on the right-hand side of equation (1) has dimension m and represents the conductivity values in the initial earth model. m represents the number of modeled conductivity values and n represents the number of apparent conductivity measurements which are used in the inversion process.

After the initial model is generated by inversion, a singular value decomposition (SVD) can be performed on the initial model. As a result of the SVD, the G matrix in equation (1) can be represented by the expression:

$$\hat{G} = \hat{U}\hat{S}\hat{V}^T \qquad (2)$$

where matrix U is an m×n dimension matrix with orthonormal columns, matrix S is a diagonal matrix having dimension m×m, and matrix V is an orthogonal matrix having dimension m×m. All the columns of matrix V are orthonormal. Superscript T in the notation $V^T$ indicates the transposition of matrix V. A consequence of performing the SVD on the initial earth model is that the model described by equation (1) can then be represented by the expression:

$$\vec{\sigma}_a = (US)(V^T\sigma) \qquad (3)$$

Introducing a new vector π from equation (3):

$$\hat{V}^T\vec{\sigma} = \vec{\pi} = \begin{pmatrix} \pi_1 \\ \pi_2 \\ \pi_3 \\ \ldots \\ \pi_m \end{pmatrix} \qquad (4)$$

The components $\pi_j$ (j=1, . . . , m) of vector π constitute linear combinations of the original vector parameters $\sigma_j$ (j=1, . . . , m), which in turn form vector σ in equation (4). Both vectors σ and π are of the same physical nature. By knowing vector π, it is possible to determine vector σ. Since matrix V is an orthogonal matrix, its inverse is transposed matrix $V^T$ and vise versa; the inverse of matrix $V^T$ is matrix V. Finally, it is also true that:

$$\vec{\sigma} = \hat{V}\vec{\pi} \qquad (5)$$

In evaluating the matrix US in equation (3), as previously explained, the columns of matrix U are orthogonal and can be normalized to a unit value. After multiplying matrix U by the diagonal matrix S all the columns of matrix U become rescaled by corresponding elements of the matrix S as shown in the following expression:

$$\hat{US} = \left[ s_1 \begin{pmatrix} u_{11} \\ u_{21} \\ \ldots \\ u_{n1} \end{pmatrix}, s_2 \begin{pmatrix} u_{12} \\ u_{22} \\ \ldots \\ u_{n2} \end{pmatrix}, \ldots, s_m \begin{pmatrix} u_{1m} \\ u_{2m} \\ \ldots \\ u_{nm} \end{pmatrix} \right] \quad (6)$$

By substituting equations (4) and (6) into equation (3), the singular value decomposition of the response matrix $\sigma_a$ is obtained, with the columns of matrix U used as a basis:

$$\vec{\sigma}_a = s_1 \pi_1 \begin{pmatrix} u_{11} \\ u_{21} \\ \ldots \\ u_{n1} \end{pmatrix} + s_2 \pi_2 \begin{pmatrix} u_{12} \\ u_{22} \\ \ldots \\ u_{n2} \end{pmatrix} + \ldots + s_m \pi_m \begin{pmatrix} u_{1m} \\ u_{2m} \\ \ldots \\ u_{nm} \end{pmatrix} \quad (7)$$

By introducing the following notation for the columns of matrix U:

$$\vec{u}_j = \begin{pmatrix} u_{1j} \\ u_{2j} \\ \ldots \\ u_{nj} \end{pmatrix} \quad (8)$$

and by taking into account equation (8), equation (7) may then be rewritten in the form:

$$\vec{\sigma}_a = s_1 \pi_1 \vec{u}_1 + s_2 \pi_2 \vec{u}_2 + \ldots + s_m \pi_m \vec{u}_m \quad (9)$$

Taking advantage of the orthogonality of columns $u_j(j=1, \ldots, m)$, the projections of the instrument response vector $\sigma_a$ onto vectors $u_j(j=1, \ldots, m)$ can be calculated by the expression:

$$\vec{\sigma}_a \vec{u}_j = s_j \pi_j \quad (10)$$

The value of each of the projections $s_j \pi_j (j=1, \ldots, m)$ reflects the significance of the contribution made by vector $u_j$ into the response vector $\sigma_a$, where $s_j$ represent "significance factors" from the diagonal matrix S. It is assumed that the projections are arranged in descending order of their significance, meaning that:

$$s_1 \pi_1 > s_2 \pi_2 > \ldots > s_m \pi_m \quad (11)$$

It has been determined that the magnitude range of the significance factors $s_j$ can be several orders of magnitude or more. It is therefore the case that some of the values of the projection $s_j \pi_j$ which have such small significance factors may only contribute an inconsequential amount to the overall response of the instrument 10. Consequently, the corresponding eigenparameters $\pi_j$, and some of the associated conductivity values $V\pi$ may not be accurately determined from equations (5) and (10).

In the process of the invention, the synthetic response of the instrument 10 which is calculated by the inversion process is tested by sequentially deleting the least significant values from the singular value decomposition of equation (9) and then resynthesizing the response of the well logging instrument 10. For example, the synthetic response of the instrument 10 can be calculated by the expression:

$$\vec{\sigma}_a = \sum_{i=1}^{m} s_i \pi_i \vec{u}_i \quad (12)$$

In the invention, one or more of the least significant terms of the expression in equation (12) can be omitted. By deleting, for example, the m-th term we lose the m-th equation in the system of equation (4) which therefore becomes an incomplete (underdetermined) system of linear equations:

$$\hat{V}^T \vec{\sigma} = \vec{\pi} = \begin{vmatrix} \pi_1 \\ \pi_2 \\ \pi_3 \\ \ldots \\ \pi_{m-1} \\ ? \end{vmatrix} \quad (13)$$

The question mark (?) in the last row of the linear system in equation (13) indicates that the m-th equation does not exist, since the right hand side of this equation cannot be determined. This m-th equation can be substituted by some known prior constraint. As an example, the m-th equation could be substituted by an equation relating the resistivity of the "flushed zone" (RXO1 through RXO5 FIG. 1) to a resistivity measurement made by a radially shallow-investigating device known in the art, such as a microlaterolog, microlog or microspherically focused log. Alternatively, the flushed zone resistivities RXO1–RXO5 could be set to be equal to a shallow investigating resistivity curve generated primarily by the measurements made from the more closely spaced receivers (such as R1, R2 in FIG. 1) on the well logging instrument 10. The linear system in equation (13), including the prior constraints in the forms of linear equations may be written in the form:

$$\hat{V}_{m-1}^T \vec{\sigma} = \vec{\pi} = \begin{vmatrix} \pi_1 \\ \pi_2 \\ \pi_3 \\ \ldots \\ \pi_{m-1} \end{vmatrix} \quad (14)$$

$$\sum_{j=1}^{j=m} A_{m,j} \sigma_j = b_m$$

In equation (14), the subscript (m−1) in the matrix notation $V_{m-1}$ indicates that only the first (m−1) rows of the original matrix V are used in the actual solution.

The conductivities of the formation within the various zones about the wellbore, represented as $\sigma_i (i=1, \ldots, m)$ and defined from equation (14) are substituted into equation (1). The synthetic response of the well logging instrument 10 is then recalculated. If the difference between the synthetic response determined from the initial inversion, and the synthetic instrument response using equation (1) is less than a predetermined error threshold, then the next step in the process of the invention can be performed. The predetermined threshold is generally set to be the accuracy of the well logging instrument 10, which can be about 2 to 3 percent for typical induction resistivity well logging instruments.

Assuming that the synthetic instrument response from equation (1) matches the initially synthesized response to within the predetermined error threshold, then the (m-1.)-th equation in the linear system of equation (13) can also be substituted using an additional prior constraint. The system shown in equation (14) will then be transformed to the following expression:

$$\hat{V}_{m-1}^T \vec{\sigma} = \vec{\pi} = \begin{vmatrix} \pi_1 \\ \pi_2 \\ \pi_3 \\ \ldots \\ \pi_{m-2} \end{vmatrix} \quad (15)$$

$$\sum_{j=1}^{j=m} A_{m-1,j}\sigma_j = b_{m-1}$$

$$\sum_{j=1}^{j=m} A_{m,j}\sigma_j = b_m$$

The linear system in equation (15) can then be solved and the synthetic response of the instrument 10 again calculated using the expression in equation (1). The recalculated synthetic instrument response is compared to the initial synthetic response. If the recalculated instrument response matches the initially synthesized response to within the predetermined error threshold, then the process can be repeated by successively dropping the remaining least significant term in equation (12), and substituting new prior constraints for the dropped terms, until the synthetic response calculated using prior constraints no longer matches the initial synthetic response within the predetermined error threshold.

It has been determined that the number of equations representing the prior constraints is generally larger than the number of omitted terms, so that the linear system of equation (15) contains more equations than unknowns. This is generally true since the cited example of setting the flushed zone resistivity RXO1–RXO5 equal to the microlaterolog measurement will typically include as many individual equations as there are formation layers in the earth model. For example, if there are m layers in the model, then the flushed zone conductivity (resistivity) of each layer would be represented by an equation relating the flushed zone resistivity of that layer to the microlaterolog reading for that layer. This can be represented by the expression:

$$\begin{vmatrix} V_{1,1} V_{1,2}, \ldots, V_{1,m} \\ V_{2,1} V_{2,2}, \ldots, V_{2,m} \\ \ldots \\ V_{k,1} V_{k,2}, \ldots, V_{k,m} \\ A_{1,1} A_{1,2}, \ldots, A_{1,m} \\ A_{2,1} A_{2,2}, \ldots, A_{2,m} \\ \ldots \\ A_{l,1} A_{l,2}, \ldots, A_{l,m} \end{vmatrix} \begin{pmatrix} \sigma_1 \\ \sigma_2 \\ . \\ . \\ . \\ \sigma_m \end{pmatrix} = \begin{pmatrix} \pi_1 \\ \pi_2 \\ \ldots \\ \pi_k \\ b_1 \\ b_2 \\ \ldots \\ b_l \end{pmatrix} \quad (16)$$

$$k + l > m$$

The subscript k in the linear system shown in equation (16) represents the number of terms remaining in the singular value decomposition after the least significant terms are dropped. The system in equation (16) is solved so that the first k equations are satisfied exactly and the remaining l equations, representing the prior constraints, are satisfied in terms of a least squares solution. This means that the remaining l equations in the expression of equation (16) are solved so that the prior constraints represent target values for the solution to the remaining l linear equations. Methods for exactly solving linear systems so that the first k equations are solved exactly and the remaining l equations satisfy a least squares fit are known in the art and include Lagrangian multipliers. The instrument responses can be synthesized using the model generated as a result of solving the system in equation (16). The synthetic instrument responses which fall within the error threshold are then compared by observing the misfit of the prior constraints in the linear system of equation (16). The model resistivity (conductivity) distribution which most closely matches the prior constraints in the system of equation (16) can then be selected as the best overall solution.

This entire process can be repeated from the step of substituting prior constraints for the m-th expression in equation (13) using different prior constraints. For example, if in the first run of the process of the invention, microlaterolog measurements were used to represent the flushed zone resistivity RXO1–RXO5, in a second run of the process of the invention, the measurements from the more closely spaced receivers R1, R2 in the instrument (10 in FIG. 1) can be used to represent the flushed zone resistivity RXO1–RXO5.

Figure 2:
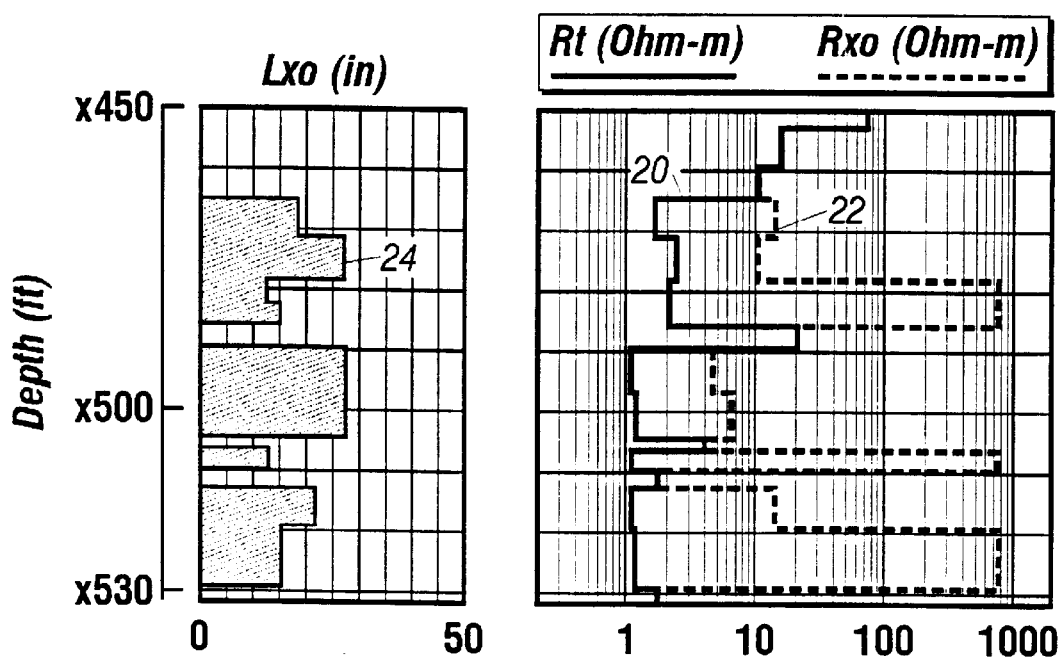
FIG. 2 shows an earth model generated by prior art inversion processing.
Figure 3:
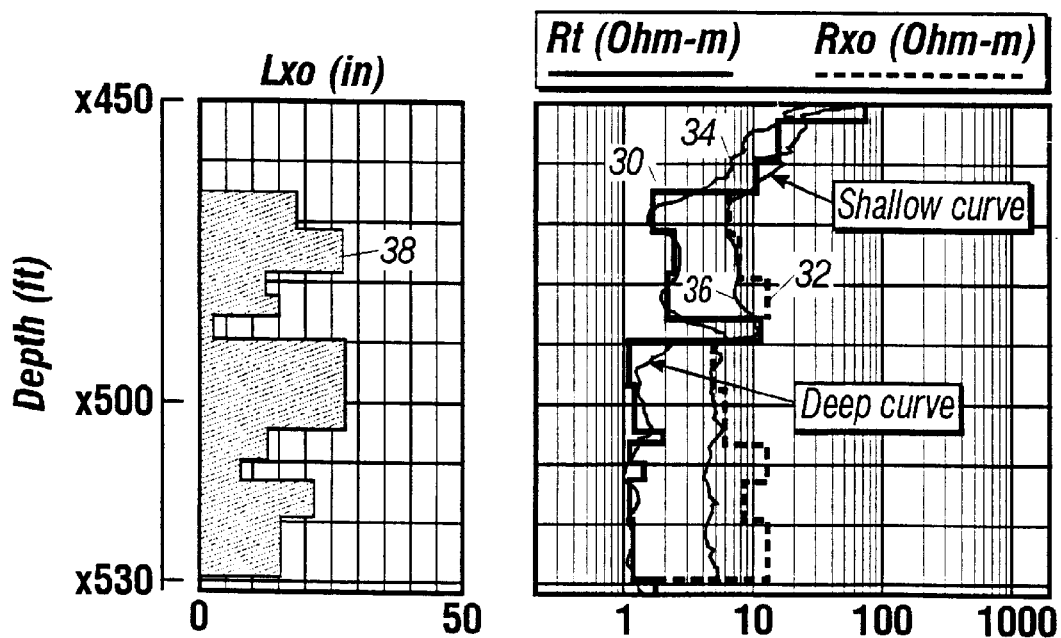
FIG. 3 shows an improved earth model generated by the process of the invention.

A comparison of inversion processing without using the process of the invention with the result using the method of the invention can be observed by referring to FIGS. 2 and 3. In FIG. 2, an initial earth model derived from measured instrument responses is shown as diameter of invasion curve 24, uninvaded zone resistivity (RT) curve 20 and flushed zone resistivity (RXO) curve 22. The model in FIG. 2 was generated by using 2-dimensional inversion processing known in the art, as described in the Tabarovsky et al reference, supra. FIG. 3 shows the result of the inversion process when the resulting model is constrained using the method of the invention. The diameter of invasion curve is shown at 24, the uninvaded zone resistivity is shown at 30, the flushed zone resistivity is shown at 32. In the example of FIG. 3, the constraints on the model were set so that the uninvaded zone resistivity was equal to the deep reading resistivity curve 34, and the flushed zone resistivity was set equal to the shallow resistivity curve 36. In the example of FIG. 3, the deep resistivity curve 34 is equal to the radially deepest reading resistivity from an induction logging instrument and the shallow resistivity curve 36 is equal to the radially shallowest induction resistivity curve from the same instrument. Induction logging devices having multiple radial depth of investigation induction curves are known in the art. The improvement in the earth model provided by the method of the invention is readily apparent when observing the flushed zone resistivity curves (22 in FIG. 2 and 32 in FIG. 3) as the flushed zone curve from prior art inversion includes a number of values which appear to be substantially impossible.

Those skilled in the art will readily devise other embodiments of the invention which do not depart from the spirit of the invention as described herein. Accordingly, the invention should be limited in scope only by the attached claims.

What is claimed is:

1. A method of determining a formation model which will simulate response of a well logging instrument in view of prior constraint on said model, comprising:

inversion processing a measured response of said well logging instrument to generate an initial model;

synthesizing a response of said instrument to said initial earth model;

performing a singular value decomposition on said synthetic response to generate eigenparameters of said initial model;

sequentially substituting ones of said eigenparameters having least significant overall contribution to said synthetic response with linear equations representing said prior constraints on said initial earth model;

solving a linear system, including remaining ones of said eigenparameters and said linear equations, so that values of said eigenparameters are exactly preserved and said linear equations satisfy a least squares fit;

synthesizing an additional instrument response for each solution to said linear system;

selecting ones of said additional instrument responses which fall below a predetermined error threshold with respect to said synthesized response to said initial model; and selecting one of said solutions to said linear system which represents an earth model providing minimum misfit with respect to equations representing said prior constraints.

2. The method as defined in claim 1 wherein said prior constraints comprise setting a flushed zone resistivity equal to a shallow induction resistivity measurement.

3. The method as defined in claim 1 wherein said prior constraints comprise setting a flushed zone resistivity equal to a microlaterolog measurement.

4. The method as defined in claim 1 wherein said prior constraints comprise setting an uninvaded zone resistivity equal to a deep induction resistivity measurement.

5. The method as defined in claim 1 further comprising:

selecting different prior constraints;

sequentially substituting ones of said eigenparameters having least significant overall contribution to said synthetic response with linear equations representing said different prior constraints on said initial earth model;

solving a linear system, including remaining ones of said eigenparameters and said linear equations, so that said values of said eigenparameters are exactly preserved and said linear equations satisfy a least squares fit;

synthesizing an additional instrument response for each solution to said linear system;

selecting ones of said additional instrument responses which fall below a predetermined error threshold with respect to said synthesized response to said initial model; and selecting one of said solutions to said linear system which represents an earth model providing minimum misfit with respect to equations representing said different prior constraints.

\* \* \* \* \*